US011485028B2

(12) United States Patent
Zhang et al.

(10) Patent No.: US 11,485,028 B2
(45) Date of Patent: Nov. 1, 2022

(54) LINEAR JOINT AND LEGGED ROBOT HAVING THE SAME

(71) Applicant: UBTECH ROBOTICS CORP LTD, Shenzhen (CN)

(72) Inventors: Zhihua Zhang, Shenzhen (CN); Mingguo Zhao, Shenzhen (CN); Hailei Li, Shenzhen (CN); Kang Li, Shenzhen (CN); Weining Zhang, Shenzhen (CN); Guangjun Hei, Shenzhen (CN); Xiaoyu He, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 569 days.

(21) Appl. No.: 16/566,908

(22) Filed: Sep. 11, 2019

(65) Prior Publication Data
US 2020/0361101 A1    Nov. 19, 2020

(30) Foreign Application Priority Data

May 16, 2019  (CN) .......................... 201910407492.9

(51) Int. Cl.
*B25J 17/02*   (2006.01)
*B25J 19/00*   (2006.01)
*B25J 19/02*   (2006.01)
*B62D 57/032*   (2006.01)

(52) U.S. Cl.
CPC ....... *B25J 17/0241* (2013.01); *B25J 19/0004* (2013.01); *B25J 19/0025* (2013.01); *B25J 19/02* (2013.01); *B62D 57/032* (2013.01)

(58) Field of Classification Search
CPC .. B25J 9/106; B25J 9/102; B25J 9/123; F16H 25/2015; F16H 2025/204
See application file for complete search history.

(56) References Cited

U.S. PATENT DOCUMENTS

| 5,346,045 | A   | * | 9/1994 | Bennett  | G09B 9/12 74/89.37 |
| 5,394,288 | A   | * | 2/1995 | Nishida  | H02H 7/0853 361/23 |
| 7,736,394 | B2  | * | 6/2010 | Bedard   | A61F 2/644 623/44 |
| 8,138,707 | B2  | * | 3/2012 | Takenaka | B62D 57/032 901/1 |
| 2017/0067548 | A1 | * | 3/2017 | Neuhaus | H02P 1/00 |
| 2018/0055712 | A1 | * | 3/2018 | Gayral  | A61H 1/0266 |
| 2018/0172121 | A1 | * | 6/2018 | Potter  | B25J 17/0241 |

(Continued)

FOREIGN PATENT DOCUMENTS

| CN | 102931760 A | 2/2013 |
| CN | 103448828   | 12/2013 |
| CN | 106992627 A | 7/2017 |

(Continued)

*Primary Examiner* — Jake Cook

(57) ABSTRACT

A linear joint includes a motor assembly includes a rotating shaft for outputting motion; a transmission mechanism including a screw and a nut threadedly connected to the screw, the nut being coaxial with respect to and securely connected to the rotating shaft so as to be rotatable together with the rotating shaft; and a rod connected to a first end of the screw so as to move together with the screw along a lengthwise direction of the screw.

17 Claims, 16 Drawing Sheets

(56) References Cited

U.S. PATENT DOCUMENTS

2021/0291359 A1\* 9/2021 Kamikawa ............. A61B 34/30

FOREIGN PATENT DOCUMENTS

| CN | 107128397 | 9/2017 |
| CN | 108233619 | 6/2018 |
| CN | 109723781 | 5/2019 |
| JP | 2012047317 A | 3/2012 |
| JP | 2019002461 | 1/2019 |
| WO | WO2015057111 A1 | 4/2015 |

\* cited by examiner

LINEAR JOINT AND LEGGED ROBOT HAVING THE SAME

CROSS REFERENCE TO RELATED APPLICATIONS

This application claims priority to Chinese Patent Application No. 201910407492.9, filed May 16, 2019, which is hereby incorporated by reference herein as if set forth in its entirety.

BACKGROUND

1. Technical Field

The present disclosure generally relates to robots, and particularly to a linear joint and a robot including the linear joint.

2. Description of Related Art

Legged robots are known and may have a plurality of members forming the robot's legs and arms. The motion of these members may be controlled by actuators such as hydraulic cylinders and motors. The actuators including a motor and a reducer connected to the motor are easy to control, but the reducer has the disadvantages of high cost and low efficiency. The hydraulic cylinder solution requires a complete hydraulic system such as an oil pump, an oil pump motor, a servo valve, and a pipeline, which is complicated in structure and control and may have a risk of oil leakage.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
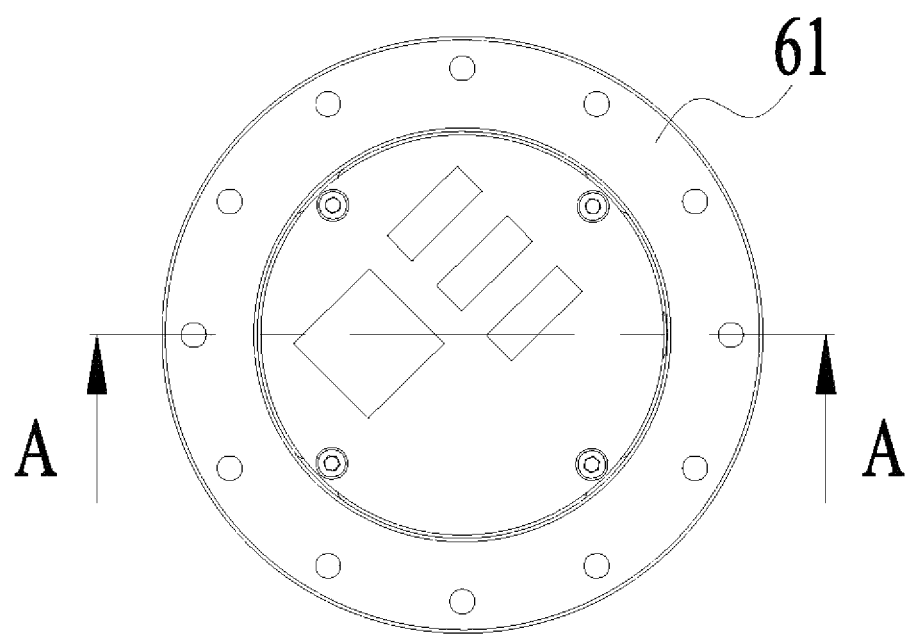
FIG. 1 is a top view of a linear joint according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
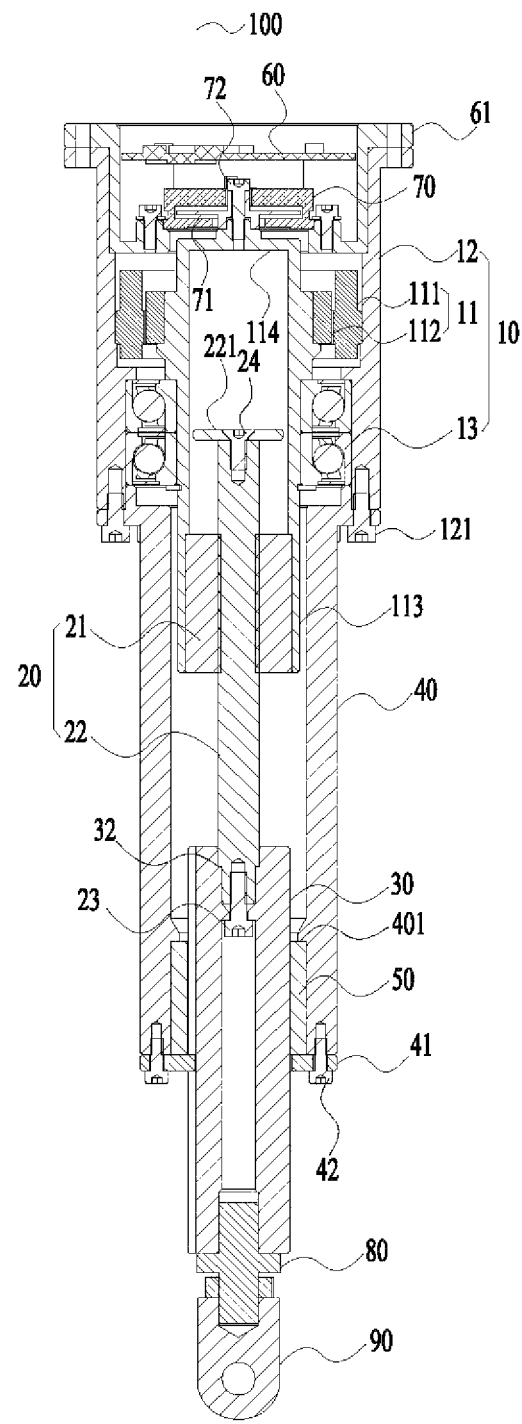
FIG. 2 is cross-sectional view of the linear joint of FIG. 1 taken along lines A-A.

Referring to FIGS. 1 and 2, in one embodiment, a linear joint 100 includes a motor assembly 10, a transmission mechanism 20, a rod 30 and a joint housing 40. The joint housing 40 is hollow and receives the transmission mechanism 20 therein. The motor assembly 10 is fixedly coupled to the joint housing 40. In one embodiment, they can be connected to each other by fasteners 121, including but not limited to screws or the like. One end of the rod 30 is connected to one end of the transmission mechanism 20 away from the motor assembly 10. The transmission mechanism 20 can be in the form of a lead screw mechanism, a ball screw mechanism, a planetary roller screw mechanism, and the like.

The motor assembly 10 includes a rotating shaft 113 for outputting rotational motion, and the rotating shaft 113 is a hollow shaft. The transmission mechanism 20 is at least partially received in the joint housing 40, and is coaxial with respect to and connected to the rotating shaft 113. The rod 30 is coupled to one end of the transmission mechanism 20. The transmission mechanism 20 converts rotational motion of the rotating shaft 113 into a linear motion of the rod 30 in the axial direction of the rotating shaft 113. In an alternative embodiment, the rod 30 may not be coaxial with respect to the rotating shaft 113.

Compared with the hydraulic cylinders, the control of a motor is simple and there is no risk of oil leakage. Compared with reducers, the transmission mechanism 20 has the advantages of simple structure, low cost, low friction coefficient and high efficiency. Therefore, the linear joint 100 has the advantages of simple structure, low cost, low friction coefficient, high efficiency, being no risk of oil leakage, and simple control.

Figure 3:
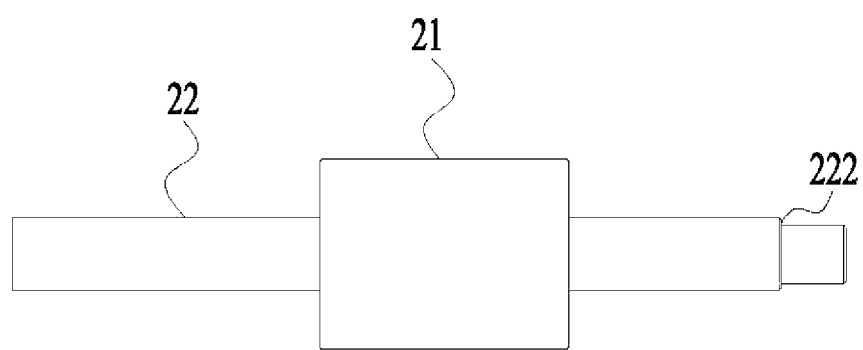
FIG. 3 is a schematic view of a transmission mechanism of the linear joint of FIG. 1.
Figure 4:
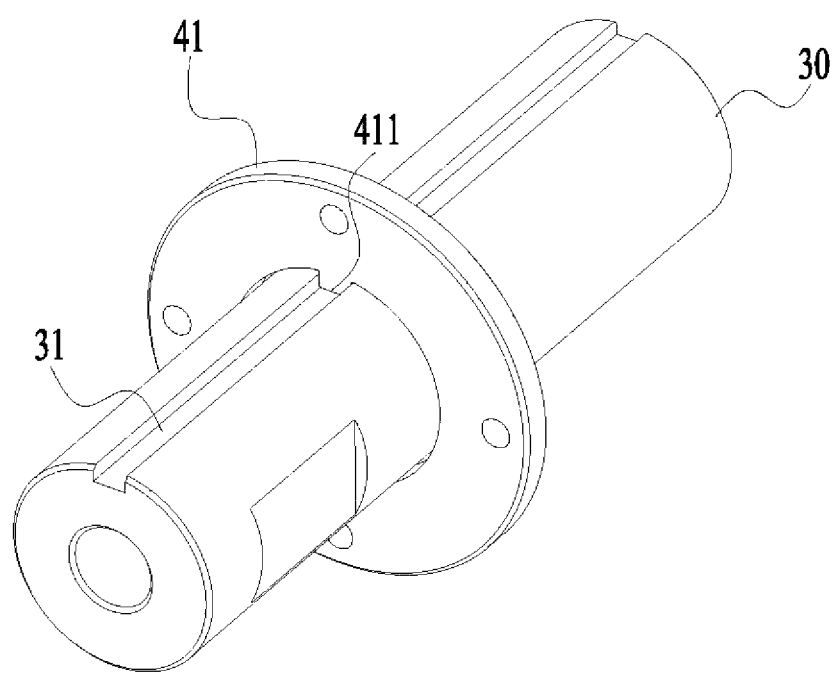
FIG. 4 is an isometric view of a screw and an anti-rotation mechanism of the linear joint of FIG. 1.

Referring to FIGS. 3 and 4, in one embodiment, the transmission mechanism 20 includes a nut 21 and a screw 22. The nut 21 is fixedly received in the rotating shaft 113, and is rotatable together with the rotating shaft 113. The nut 21 is threadedly connected to the screw 22. The rod 30 is connected to the end of the screw 22 and moves together with the screw 22. When the nut 21 rotates together with the rotating shaft 113, the screw 22 drives the rod 30 to move along the axial direction of the rotating shaft 113. The rod 30 is connected to one end of the screw 22 by a second fastener 23, which includes, but is not limited to, a screw or the like. In one embodiment, the screw 22 includes a shoulder 222 adjacent to an end facing the rod 30. The rod 30 defines a stepped hole 32 in an end facing the screw 22. When the end of the screw 22 is inserted into the hole 32, the shoulder 32 abuts against the annular surface connecting the larger hole to the smaller hole of the stepped hole 32, which can axially position the screw 22.

The rod 30 includes an anti-rotation mechanism 41 for preventing the rotation of the rod 30, and the anti-rotation mechanism 41 is arranged at an end of the joint housing 40 away from the end of the motor assembly 10. The anti-rotation mechanism 41 includes a ring that is arranged around the rod 30 and fixedly coupled to the lower end of the joint housing 40 by a third fastener 42 including but not limited to screws and the like. Preferably, the anti-rotation mechanism 41 is fixedly coupled to the lower end of the joint housing 40 by a number of third fasteners 42, and the third fasteners 42 are evenly arranged along the circumferential direction of the joint housing 40.

Referring to FIG. 3, the anti-rotation mechanism 41 further includes a groove 31 defined in an outer surface of the rod 30 and extending along a lengthwise direction of the rod 30. The ring includes a protrusion 411 that protrudes from an inner surface thereof and is received in the groove 31, which allows the rod 30 to move in the lengthwise direction of the joint housing 40 and prevents the rod 30 from rotating with respect to the joint housing 40. The screw 22 is thus prevented from rotating with respect to the nut 21. The number of the protrusions 411 and the grooves 31 can be selected according to actual needs, and is not limited herein.

In one embodiment, the screw 22 cannot rotate when the nut 21 rotates, and can only move along its own axis because of the anti-rotation mechanism 41. The linear motion of the screw 22 will then drive the rod 30 to move along the lengthwise direction of the screw 22.

In one embodiment, a stopper member 221 is arranged on a top end of the screw 22 which is away from the rod 30 and used to prevent the screw 22 from disengaging from the nut 21. The stopper member 221 includes a circular plate and a rod protruding from the plate, and is fixed to the screw 22 by a fourth fastener 24 including but not limited to a screw. The top end of the screw 22 abuts against the lower surface of the circular plate of the stopper member 221. The circular plate of the stopper member 221 has a diameter greater than the diameter of the screw 22. The stopper member 221 moves together with the screw 22 and the movement of the screw 22 is stopped when the stopper member 221 comes into contact with the nut 21. As a result, the screw 22 is prevented from disengaging from the nut 21. A gap is formed between the stopper member 221 and the inner surface of the rotating shaft 113 so as to prevent the stopper member 221 from bumping into the inner surface of the rotating shaft 113 and allow the screw 22 and the rod 30 to move with respect to the rotating shaft 113.

In one embodiment, the linear joint 100 further includes a linear bearing 50 arranged around the rod 30 and received in the joint housing 40. The linear bearing 50 slidably connects the rod 30 to the joint housing 40. The linear bearing 50 is mounted at an end of the joint housing 40 away from the motor assembly 10. The inner surface of the linear bearing 50 abuts against the outer surface of the rod 30. The outer surface of the linear bearing 50 abuts against the inner surface of the joint housing 40. The lower end surface of the linear bearing 50 abuts against the upper end surface of the anti-rotation mechanism 41. The upper end surface of the linear bearing 50 abuts against a protrusion 401 protruding from the inner surface of the joint housing 40. With such arrangement, the linear bearing 50 is held in position. The linear bearing 50 can be, but is not limited to, a ball linear bearing, a sliding bearing, a sleeve made of a low friction coefficient material such as Teflon, and the like.

Figure 5:
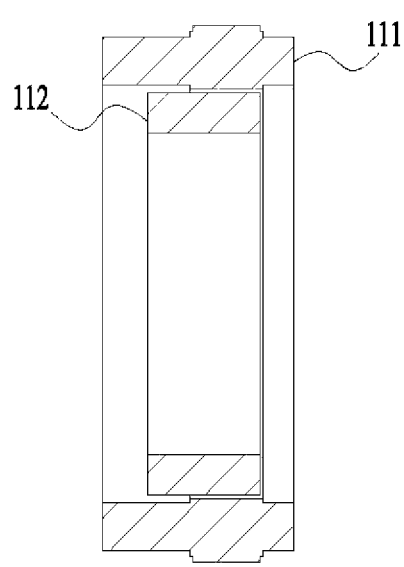
FIG. 5 is a schematic cross-sectional view of a motor of the linear joint of FIG. 1.

In one embodiment, the motor assembly 10 includes a motor 11, a motor housing 12, and a rolling bearing 13. Referring to FIG. 5, the motor 11 includes the rotating shaft 113, a stator 111 fixedly received in the motor housing 12, and a rotor 112 arranged in the stator 111 and fixedly arranged around the rotating shaft 113. The rolling bearing 13 is arranged between the rotating shaft 113 and the motor housing 12. The inner ring of the bearing 13 is fixed on the rotating shaft 113, and the outer ring is fixed in the motor housing 12 to ensure that the stator 111 and the rotor 112 are coaxial. The motor housing 12 is fixedly coupled to the joint housing 40, and the motor housing 12, the joint housing 40, and the rotating shaft 113 limit the position of the rolling bearing 13. The rolling bearing 13 should be well lubricated, and enables the motor 11 to be operated at a high speed and with low noise. The rolling bearing 13 includes but is not limited to a single row bearing, a double row bearing and a multi-row bearing. The motor 11 includes, but is not limited to, an AC permanent magnet synchronous motor, a brushless DC motor, a brushed DC motor, and the like.

Figure 6:
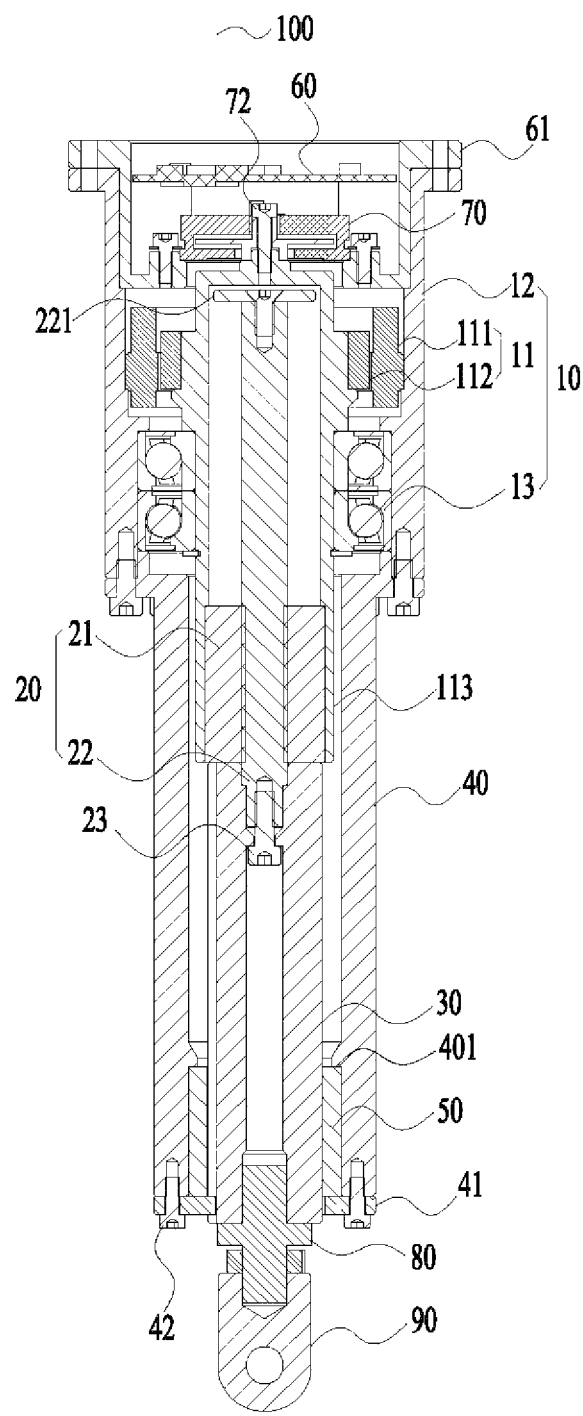
FIG. 6 is similar to FIG. 2, but showing the linear joint in a fully retracted state.
Figure 7:
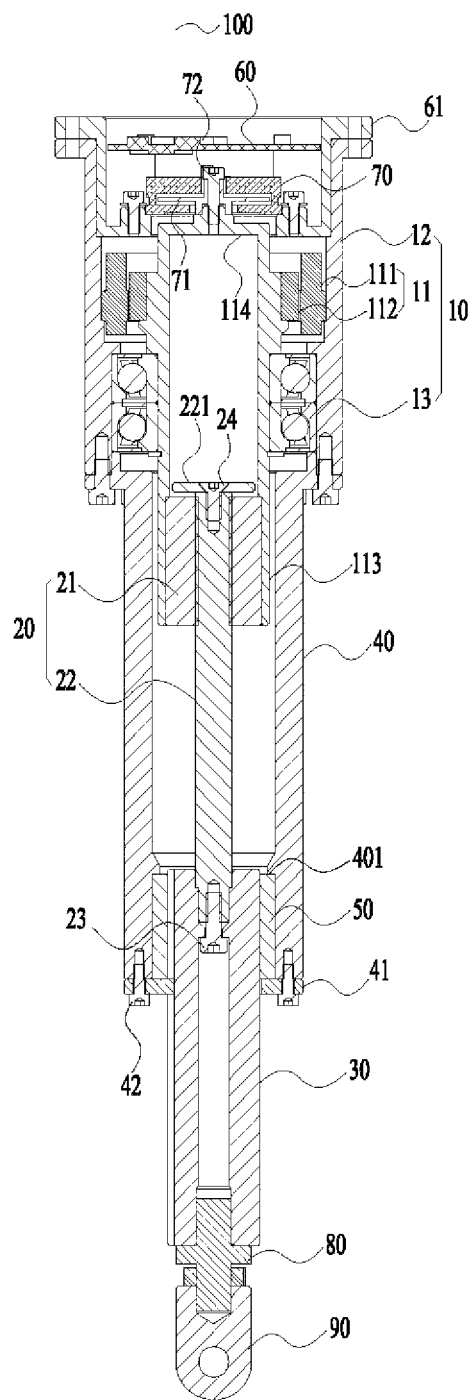
FIG. 7 is similar to FIG. 2, but showing the linear joint in a fully extended state.

In one embodiment, the rotating shaft 113 includes a closed end 114 to stop movement of the screw 22 when the screw 22 comes into contact with the closed end 114. Specifically, the stopper member 221 moves together with the screw 22 and the movement of the screw 22 is stopped when the stopper member 221 comes into contact with closed end 114. Referring to FIG. 6, when the stopper member 221 is near the closed end 114, the rod 30 is almost completely received in the joint housing 40. In the embodiment, the closed end 114 and the rotating shaft 113 is integrally formed.

In one embodiment, a first elastic member (not shown) is disposed between the closed end 114 of the rotating shaft and the screw 22. That is, the first elastic member is disposed between the inner side of the closed end 114 and the upper end surface of the stopper member 221. The first elastic member is made of an elastic material, which serves as a cushioning member to absorb shock and also reduces the noise generated when the linear joint is in operation. The first elastic member may be connected to the inner side of the closed end 114 or may be connected to the upper end surface of the stopper member 221.

In one embodiment, the lower end of the screw 22 is received in the rod 30. A second elastic member (not shown) is arranged around the screw 22 and between the nut 21 and the rod 30. The second elastic member is made of an elastic material, which serves as a cushioning member to absorb shock and also reduces the noise generated when the linear joint is in operation. The second elastic member may be connected to the upper end surface of the rod 30 or may be connected to the lower end surface of the nut 21. When the second elastic member is fully compressed, further movement of the screw 22 is stopped and the rod 30 is almost completely received in the joint housing 40.

It should be noted that the upward movement of the screw 22 can be stopped by the engagement of the closed end 114 of the rotating shaft 113 with the stopper member 221, or by the engagement of the upper end of the rod 30 with the lower end of the nut 21. In one embodiment, the first elastic member is arranged between the closed end 114 of the rotating shaft 113 and the stopper member 221, and the second elastic member is arranged between the upper end of the rod 30 and the lower end of the nut 21.

In one embodiment, a third elastic member (not shown) is disposed between the stopper member 221 and the nut 21, and the third elastic member is arranged around the screw 22. The third elastic member is made of an elastic material, which serves as a cushioning member to absorb shock and also reduces the noise generated when the linear joint is in operation. Specifically, the third elastic member is disposed between the lower end of the stopper member 221 and the upper end of the nut 21. The third elastic member may be connected to the lower end of the stopper member 221 or may be connected to the upper end of the nut 21. When the third elastic member is fully compressed, further downward movement of the screw 22 is stopped and the rod 30 is almost completely received in the joint housing 40.

Referring to FIG. 2, the screw 22 is in a position between the uppermost position and the lowermost position and the rod 30 is not completely received in the joint housing 40.

In one embodiment, the linear joint 100 further includes a driver 60 for controlling the motor 11. The driver 60 can be first mounted on a driver base 61, and further fixed to the motor housing 12 through the driver base 61. Alternatively, the driver 60 may be mounted directly to the motor housing 12. Alternatively, the driver 60 may be mounted at other locations according to need. The driver 60 can be a control circuit board, and the motor 11 is electrically connected to the control circuit board.

In one embodiment, in order to accurately control the rod 30, the linear joint 100 further includes an encoder 70 arranged at one end of the rotating shaft 113 for converting the angular displacement of the rotating shaft 113 into an electrical signal and feeding back to a circuit board. The circuit board outputs a control command to the motor according to the rotational angle of the rotating shaft 113 to adjust and correct the output angle of the rotating shaft 113. In the embodiment, an encoder base 71 is arranged adjacent to the closed end 114 of the rotating shaft 113. The encoder base 71 is coaxial with respect to the rotating shaft 113, and is fixed to the rotating shaft 113 by a fixing member 72. The encoder 70 is mounted on the encoder base 71.

In one embodiment, the linear joint 100 further includes a force sensor 80 coupled to one end of the rod 30 away from the screw 22 and used to detect the axial force acting on the rod 30. The force sensor 80 is electrically connected to the driver 60. The linear joint 100 further includes a connecting member 90 fixed to an end of the force sensor 80 away from the rod 30. When the motor 11 is in operation, the rotor 112 rotates to drive the rotating shaft 113 to rotate, thereby driving the nut 21 to rotate. Due to the anti-rotation mechanism 41, the screw 22 cannot rotate, and can only move along the lengthwise direction of the transmission mechanism 20, which drives the rod 30, the force sensor 80 and the connecting member 90 to move together with the screw 22.

It should be noted that, in other embodiments, the force sensor 80 may be omitted when force control is not required. In addition, if the cost control is strict and the force control requirements are not critical, the force sensor 80 may be omitted. In these cases, by detecting the electric current of the motor 11, the torque of the motor 11 can be determined according to the proportional relationship between the torque of the motor 11 and the current of the motor 11. The axial force acting on the screw 22 is determined based on the relationship between the torque of the transmission mechanism 20 and the axial force.

One embodiment of the present disclosure also provides a legged robot comprising the linear joint 100 as described in any one of the above embodiments. The robot can be a two-legged robot 300 (FIG. 11) or a four-legged robot 200 (FIG. 8).

Figure 8:
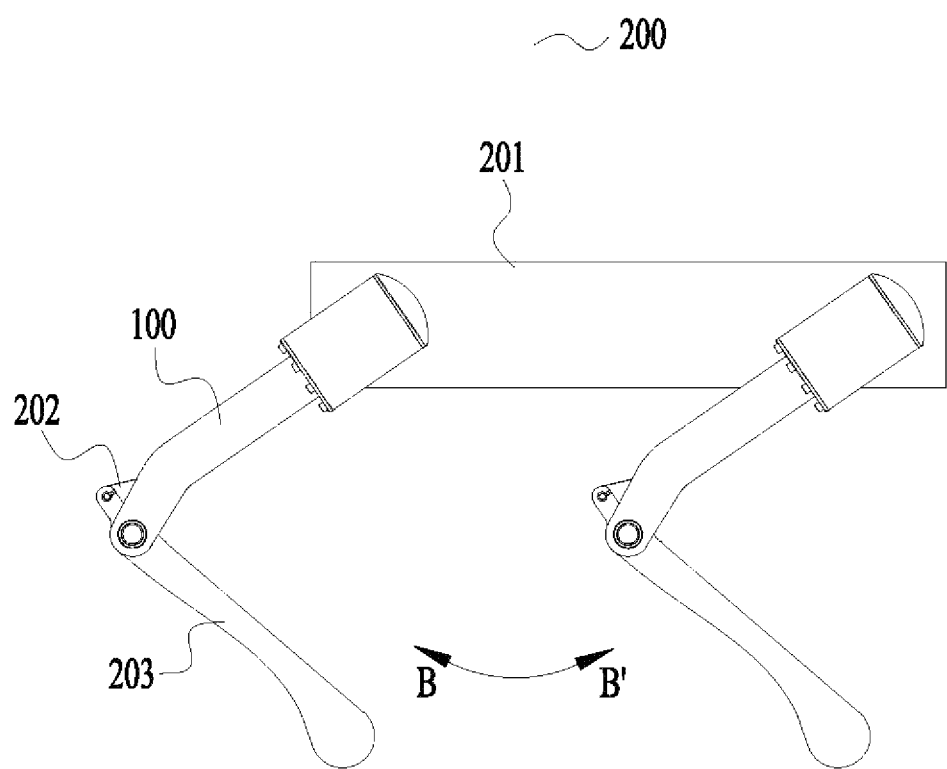
FIG. 8 is a planar side view of a four-legged robot including linear joints of FIG. 1.
Figure 9:
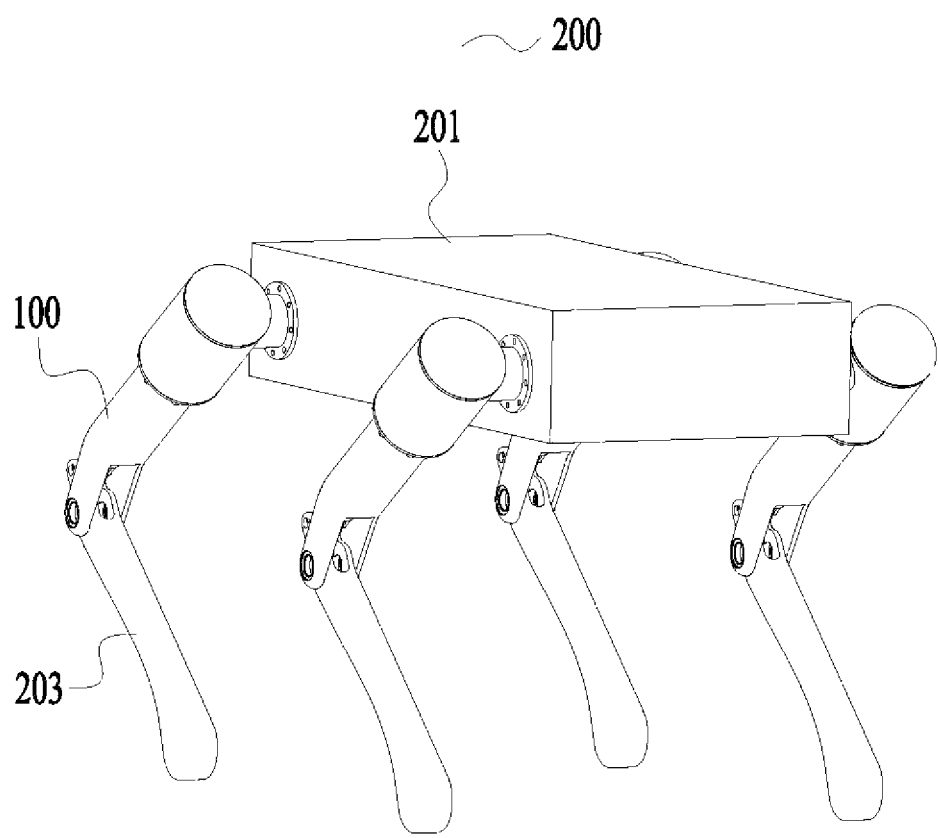
FIG. 9 is an isometric view of the four-legged robot of FIG. 8.
Figure 10:
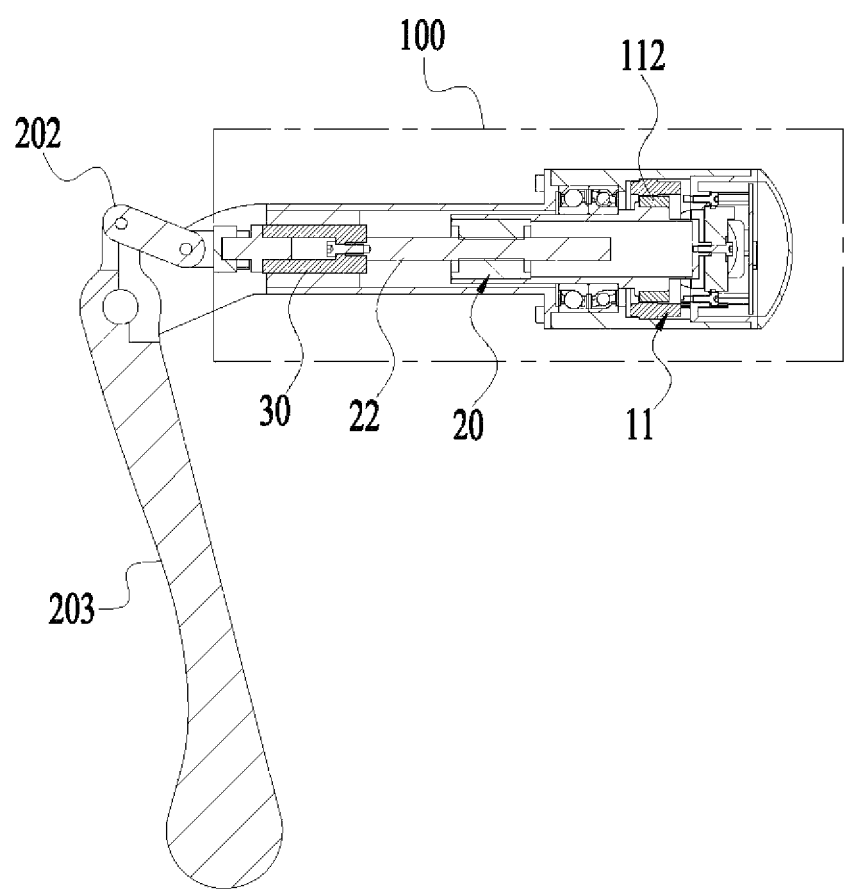
FIG. 10 is a cross-sectional view of a leg of the four-legged robot of FIG. 8.

Referring to FIGS. 8-10, in one embodiment, when the robot is a four-legged robot, the robot includes a body 201, the linear joint 100, a linkage bar 202, and a lower leg 203. The linear joint 100 is connected to the body 201, and the linear joint 100, the linkage bar 202 and the lower leg 203 constitute a crank slider mechanism. The transmission mechanism 20 of the linear joint 100 converts the rotational motion of the rotor 112 of the motor 11 into a linear motion of the screw 22, thereby driving the rod 30 to move in an axial direction. The crank slider mechanism converts the linear motion of the rod 30 into the rotational motion of the lower leg 203 (i.e. the forward/reverse rotation as indicated by arrows B and B' of FIG. 8).

Figure 11:
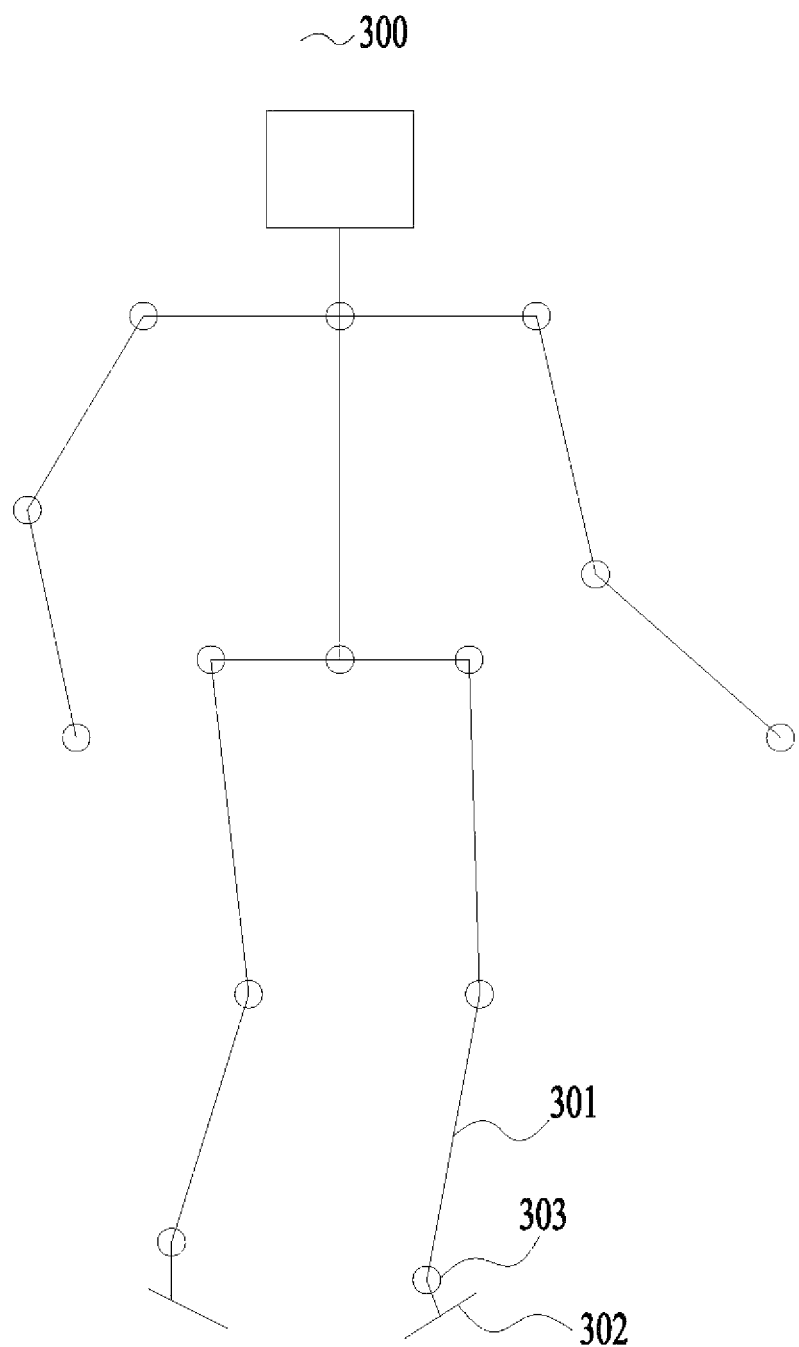
FIG. 11 is a schematic view of a two-legged robot according to an embodiment.
Figure 12:
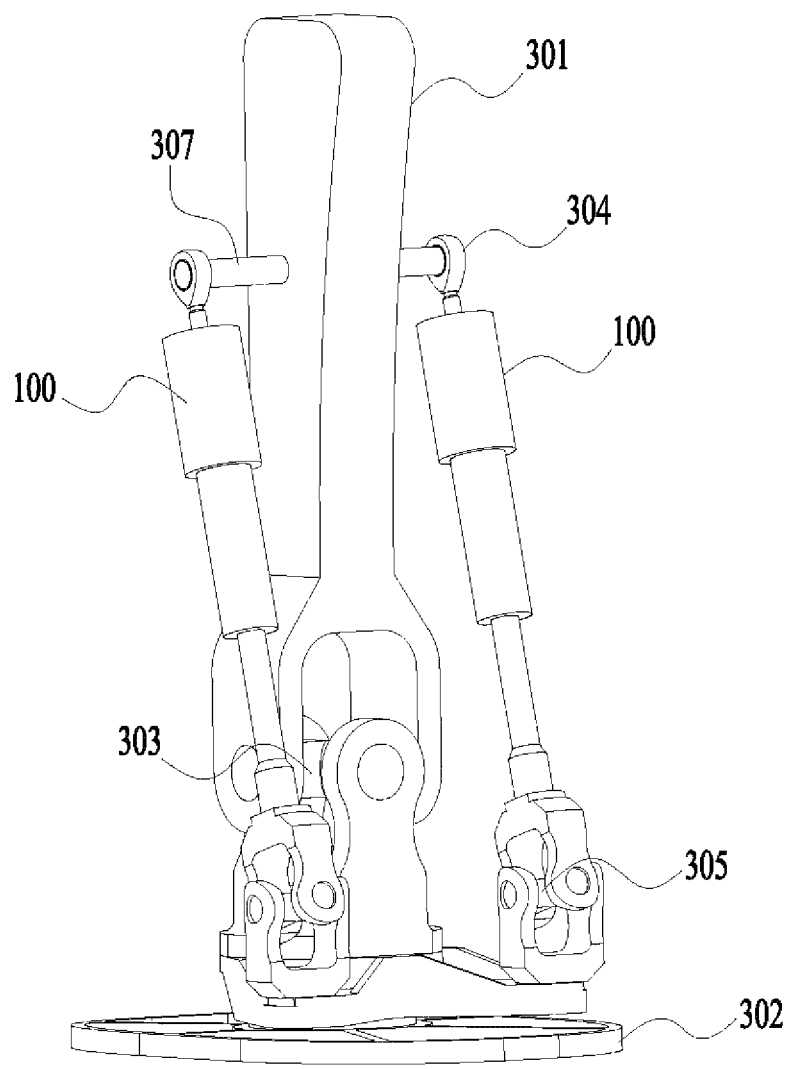
FIG. 12 is an isometric view showing a lower leg and a foot of the robot of FIG. 1 according to a first embodiment.

Referring to FIGS. 11 and 12, in one embodiment, when the robot is a two-legged robot, the robot includes a lower leg 301, a foot 302, an ankle joint 303 and one or more linear joint assemblies. In the embodiment, the number of the linear joint assemblies is two. Each linear joint assembly includes one linear joint 100, a bearing 304 and a universal joint 305. The foot 302 is connected to the lower leg 301 through the ankle joint 303. In the embodiment, the ankle joint 303 is a universal joint. The top end of the linear joint 100 near the motor 11 is connected to the lower leg 301 via the bearing 304, and the bottom end of the linear joint 100 near the rod 30 is connected to the universal joint 305. The bearing 304 is connected to a support bar 307 of the lower leg 301. The universal joint 305 is fixed to the foot 302. The two linear joint assemblies are respectively located on the left and right sides of the lower leg 301, and are symmetrically disposed with respect to the lower leg 301 (see FIG. 12).

Figure 13:
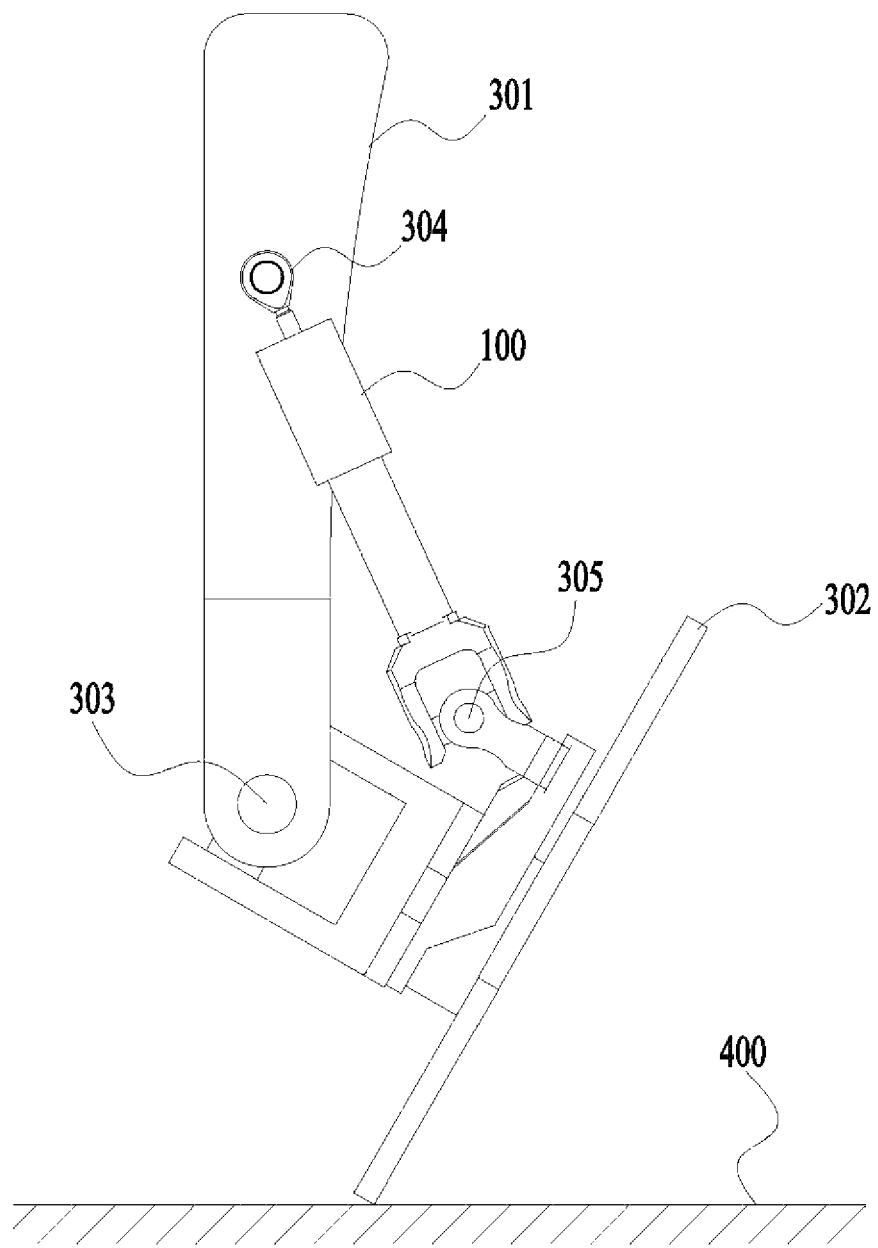
FIG. 13 is a side view of the assembly of FIG. 12 in a first state.
Figure 14:
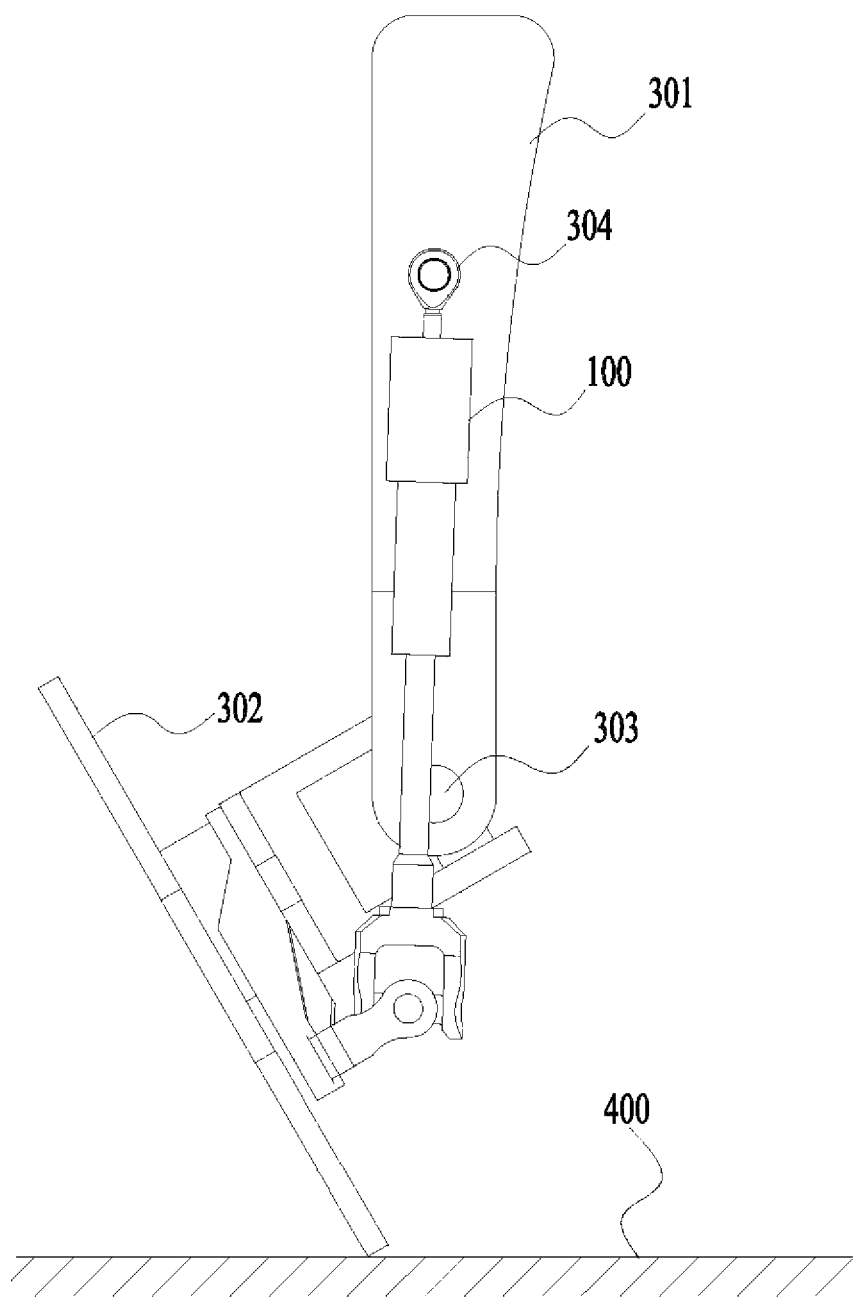
FIG. 14 is a side view of the assembly of FIG. 12 in a second state.

Referring to FIGS. 13 and 14, in on embodiment, the robot further includes a control board (not shown) and the driver 60 is electrically connected to the control board. The control board is used to control the linear joint 100. That is, the control board controls the rod 30 to extend and retract. A main control command is transmitted through the driver 60 to control the motors 11 of the two linear joints 100 to rotate in the same direction. That is, the screws 22 and the rods 30 of the two linear joints 100 are controlled to extend/retract synchronously, which drive the foot 302 to rotate away from or toward a support surface 400 (i.e. a floor).

Figure 15:
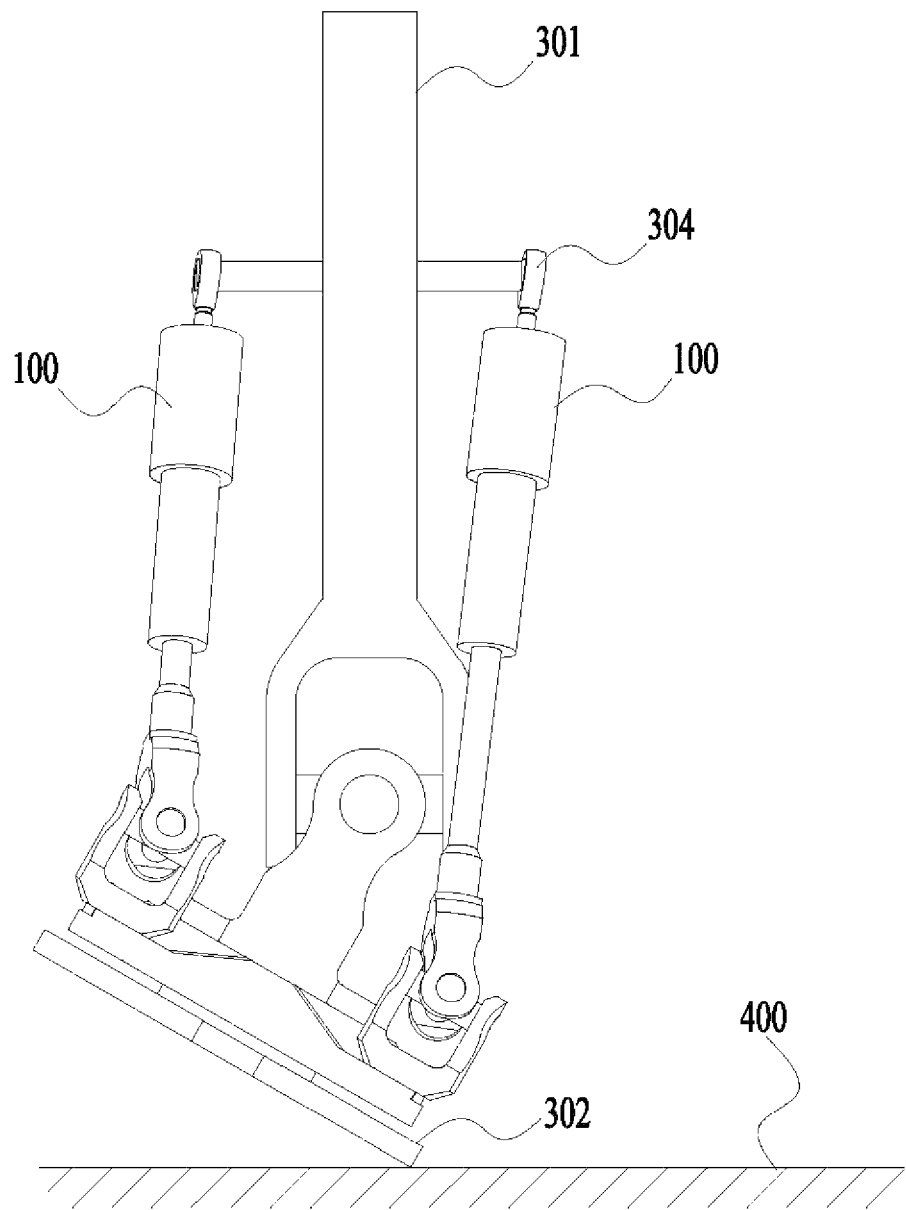
FIG. 15 is a front view of the assembly of FIG. 12 in a third state.

Referring to FIG. 15, the control board can control the screw 22 and the rod 30 of one of the two linear joints 100 to extend and can control the screw 22 and the rod 30 of the other one of the two linear joints 100 to retract. A main control command can be transmitted through the driver 60 to control the motors 11 of the two linear joints 100 to respectively rotate in a forward direction and in a reverse direction. Eversion/inversion of the foot 302 can thus be achieved.

In an alternative embodiment, the joint bearing 304 can be replaced with a universal joint, and the universal joint 305 can also be replaced with a bearing 304. It should be noted that the orientation of the linear joint 100 shown in the figures is only for the purpose of description.

Figure 16:
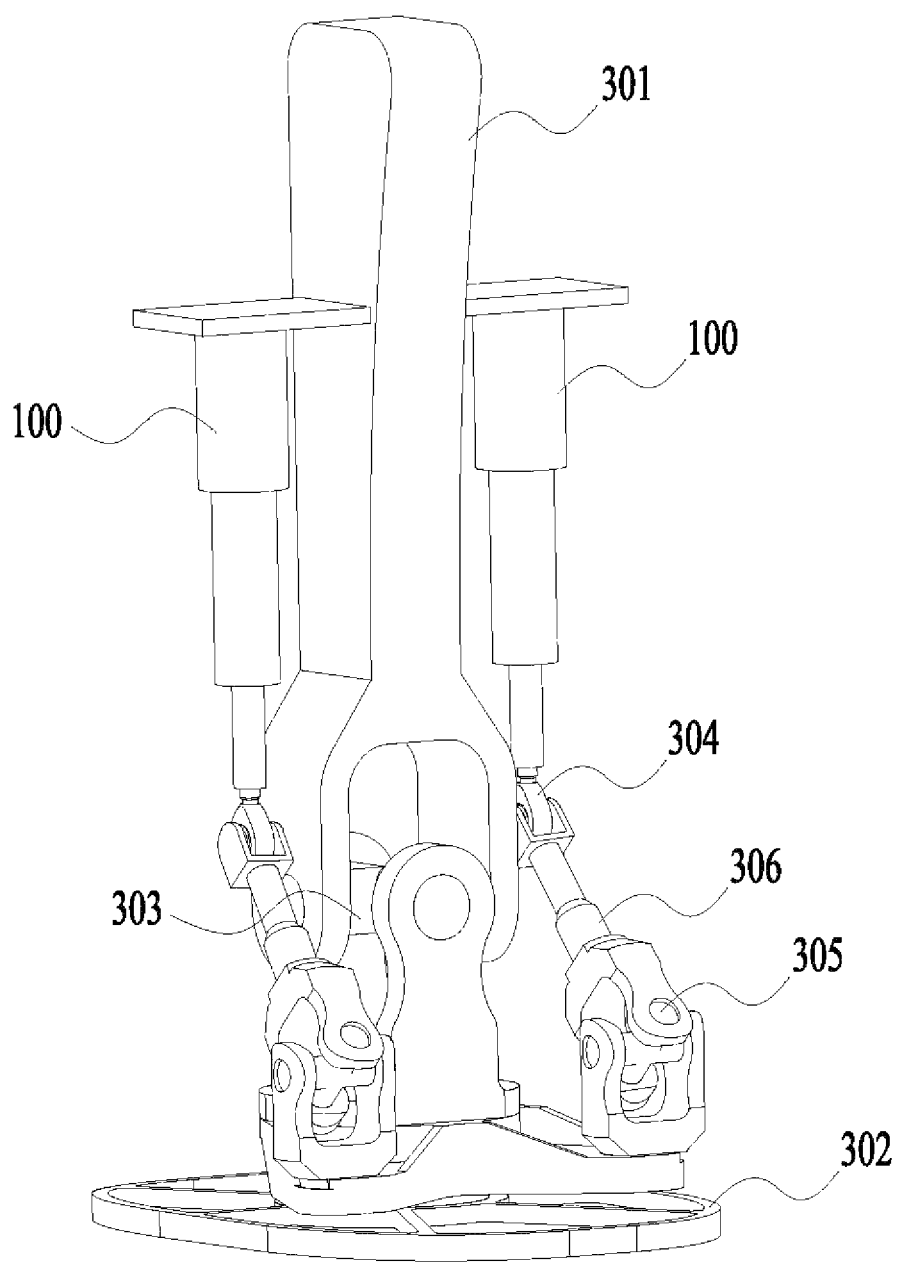
FIG. 16 is an isometric view showing a lower leg and a foot of the robot of FIG. 11 according to a second embodiment.

A two-legged robot as shown in FIG. 16 is similar to the robot of FIG. 15. The two robots have substantially the same components and differ in that the robot FIG. 16 further includes a connecting rod 306. In the embodiment, the top end of each linear joint 100 adjacent to the motor assembly is securely connected to the lower leg 301, and the lower end of each linear joint opposite the first end is rotatably connected to a top end of the connecting rod 306 through the bearing 304. A bottom end of the connecting rod 306 is rotatably connected to the universal joint 305.

The control of the two-legged robot of FIG. 16 is the same as the control of the robot of FIG. 15, which has been described above and will not repeat here.

In an alternative embodiment, the joint bearing 304 can be replaced with a universal joint, and the universal joint 305 can also be replaced with a bearing 304. It should be noted that the orientation of the linear joint 100 shown in the figures is only for the purpose of description.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A linear joint comprising:
   a motor assembly comprising a rotating shaft for outputting motion;
   a transmission mechanism comprising a screw and a nut threadedly connected to the screw, the nut being coaxial with respect to and securely connected to the rotating shaft so as to be rotatable together with the rotating shaft; and
   a rod connected to a first end of the screw so as to move together with the screw along a lengthwise direction of the screw, wherein the rod comprises an anti-rotation mechanism for preventing the rod from rotating;
   a joint housing configured to receive the transmission mechanism therein, wherein the anti-rotation mechanism comprises a groove defined in an outer surface of the rod and extending along a lengthwise direction of the rod, and a ring arranged around the rod, the ring comprises a protrusion that protrudes from an inner surface thereof and is received in the groove;
   wherein the rotating shaft comprises a closed end configured to stop movement of the screw when the screw comes into contact with the closed end.

2. The linear joint according, to claim 1, further comprising a stopper member that is arranged on a second end of the screw which is away from the rod and configured to prevent the screw from disengaging from the nut.

3. The linear joint according to claim 1, further comprising a linear bearing arranged around the rod and received in the joint housing.

4. The linear joint according to claim 1, further comprising a first elastic member arranged between the closed end of the rotating shaft and the screw.

5. The linear joint according to claim 1, wherein the motor assembly comprises a motor having die rotating shaft, a motor housing configured to receive the motor therein, and a roller bearing that is fit in the motor housing and arranged around the rotating shaft, and the rotating shaft is hollow.

6. The linear joint according to claim 5, further comprising a driver configured to control the motor.

7. The linear joint according to claim 1 further comprising a second elastic member, wherein the first end of the screw is received in the rod, the second elastic member is arranged around the screw and between the nut and the rod.

8. The linear joint according to claim 1 further comprising an encoder arranged adjacent to the closed end of the rotating shaft.

9. The linear joint according to claim 1 further comprising a force sensor and a connecting member, wherein the force sensor is fixed to an end of the rod away from the screw, and configured to detect an axial force acting on the rod, and the connecting member is fixed to an end of the force sensor away from the rod.

10. A legged robot comprising a linear joint, the linear joint comprising:
    a motor assembly comprising a rotating shaft for outputting motion;
    a transmission mechanism comprising a screw and a nut threadedly connected to the screw, the nut being coaxial with respect to and securely connected to the rotating shaft so as to be rotatable together with the rotating shaft; and
    a rod connected to a first end of the screw so as to move together with the screw along a lengthwise direction of the screw;
    wherein the rod comprises an anti-rotation mechanism for preventing the rod from rotating, and the rotating shaft comprises a closed end configured to stop movement of the screw when the screw comes into contact with the closed end.

11. A legged robot comprising a lower leg and at least one linear joint connected to the lower leg, the linear joint comprising:
    a motor assembly comprising a rotating shaft for outputting motion;
    a transmission mechanism comprising a screw and a nut threadedly connected to the screw, the nut being coaxial with respect to and securely connected to the rotating shaft so as to be rotatable together with the rotating shaft; and
    a rod connected to a first end of the screw so as to move together with the screw along a lengthwise direction of the screw, which drives the lower leg to move;
    wherein the rod comprises an anti-rotation mechanism for preventing the rod from rotating;
    wherein the rotating shaft comprises a closed end configured to stop movement of the screw when the screw comes into contact with the closed end.

12. The legged robot according to claim 11 being a four-legged robot and further comprising a body and a linkage bar, wherein the linear joint is connected to the body, and the linear joint, the linkage bar and the lower leg constitute a crank slider mechanism.

13. The legged robot according to claim 11 being a two-legged robot and further comprising two linear joint assemblies and a foot, wherein each linear joint assembly comprises one linear joint and is rotatably connected to the lower leg and the foot, and the foot is rotatably connected to the lower leg.

14. The legged robot according to claim 13, wherein each linear joint further comprises a bearing and a universal joint fixed to the foot, a first end of each linear joint adjacent to the motor assembly is rotatably connected to the lower leg through the bearing, a second end of each linear joint opposite the first end is rotatably connected to the universal joint.

15. The legged robot according to claim 13, wherein each linear joint further comprises a bearing, a universal joint fixed to the foot, and a connecting rod, a first end of each linear joint adjacent to the motor assembly is securely connected to the lower leg, a second end of each linear joint opposite the first end is rotatably connected to a top end of the connecting rod through the bearing, and a bottom end of the connecting rod is rotatably connected to the universal joint.

16. The legged robot according to claim 13, further comprising a control board and a driver electrically connected to the control board, wherein the control board is configured to control the linear joint, and the driver is configured to control the motor assembly.

17. The legged robot according to claim 11, wherein the linear joint further comprises a force sensor and a connecting member, the force sensor is fixed to an end of the rod away from the screw, and configured to detect an axial force acting on the rod, and the connecting member is fixed to an end of the force sensor away from the rod.

* * * * *